Figure 1:
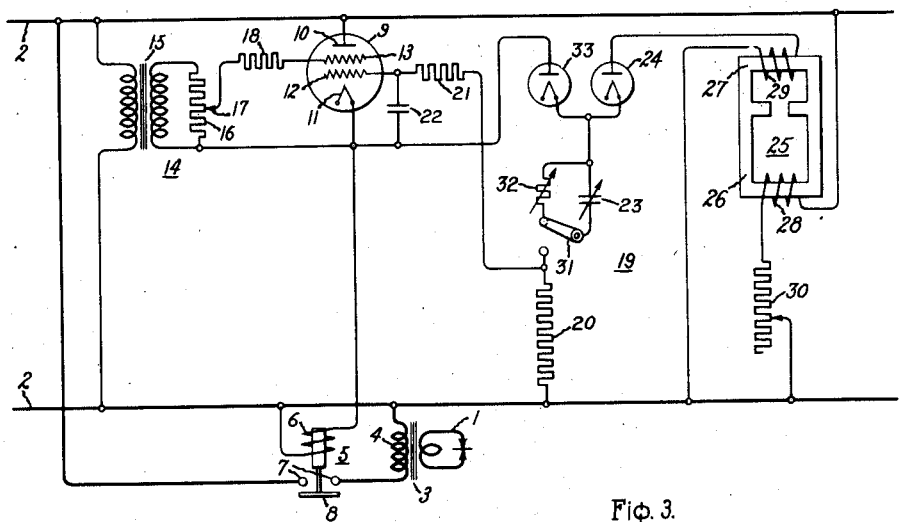

April 2, 1940.  H. L. PALMER  2,195,996

ELECTRIC CONTROL CIRCUIT

Original Filed April 24, 1937

Inventor:
Harry L. Palmer,
by Harry E. Dunham
His Attorney.

Patented Apr. 2, 1940

2,195,996

UNITED STATES PATENT OFFICE 2,195,996

ELECTRIC CONTROL CIRCUIT

Harry L. Palmer, Scotia, N. Y., assignor to General Electric Company, a corporation of New York Application April 24, 1937, Serial No. 138,776
Renewed March 29, 1939

8 Claims. (Cl. 250—27)

My invention relates to electric control circuits and more particularly to control circuits for electric valve apparatus.

In control circuits for electric valve apparatus, it is frequently desirable to provide arrangements to effect energization of a load circuit or a load device during an accurately determinable interval of time. It is also frequently highly desirable to effect energization of a load device or of an associated load circuit at an accurately determinable instant. These requirements are of particular importance in welding circuits energized from an alternating current circuit where it is desirable to effect energization of the welding circuit at a predetermined time in the cycle of alternating voltage, and where it is important to control precisely the amount of energy supplied to the welding circuit during a predetermined interval of time. Heretofore in control circuits of this nature it was found difficult to provide these control characteristics without employing auxiliary apparatus which was excessively expensive and which required apparatus of inordinate size and rating relative to the amount of energy to be controlled. Furthermore, the prior art arrangements have necessitated the use of a larger number of auxiliary or control devices to effect this essential precision and accuracy of control.

The subject matter of this application is an improvement of the subject matter disclosed and claimed in a copending application of George W. Garman, Serial No. 138,816, filed Apr. 24, 1937, entitled Electric control circuits, filed and assigned to the assignee of the present application.

It is an object of my invention to provide a new and improved electric valve circuit.

It is another object of my invention to provide a new and improved control circuit for electric valve apparatus.

It is a further object of my invention to provide a new and improved control circuit for effecting energization of a load circuit at an accurately determinable time during a cycle of voltage of an alternating current circuit.

It is a still further object of my invention to provide a new and improved control circuit for electric valve apparatus by virtue of which the period of energization of a welding circuit from an alternating current supply circuit is accurately determinable.

In accordance with the illustrated embodiments of my invention, I provide circuits for accurately and precisely controlling the time and period of energization of a load circuit such as a welding circuit. The energization of the load circuit is controlled by a translating device, such as a relay or an electromagnetic contactor, which in turn is controlled by an electric valve means. I provide a control circuit in which an electric valve, employing control means, such as a control member, is rendered conductive at a predetermined time during the cycle of applied voltage, and whereby the interval of time during which energy is supplied to the load circuit from an alternating current supply circuit is accurately determinable. More particularly, a control circuit is employed in which a bias voltage is applied to a control member of the electric valve, tending to maintain the electric valve nonconductive and the electric valve is rendered conductive for a predetermined maximum number of consecutive half cycles of voltage of the supply circuit by impressing thereon a predetermined number of impulses of voltage, each sufficient to overcome the effect of the bias voltage to render the electric valve conductive. An impedance element is connected in the control circuit and is energized from a source of alternating voltage of peaked wave form through a capacitance and a unidirectional conducting device. The impedance element introduces in the control circuit the train of impulses of positive voltage which overcome the bias voltage. I provide an improved arrangement by virtue of which an additional or cumulative charge is established on the capacitance by transferring energy from the anode-cathode circuit of the electric valve means. In this way the charge or stored energy of the capacitance is materially increased to afford a more precise control for those applications in which the desired period of energization of the load circuit is relatively short, as in those applications in which the period of energization is that corresponding to only a few cycles of voltage of the alternating current supply circuit.

Figure 2:
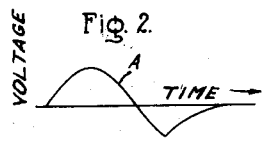
Figure 3:
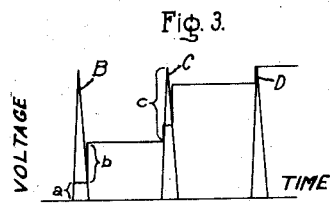
Figure 4:
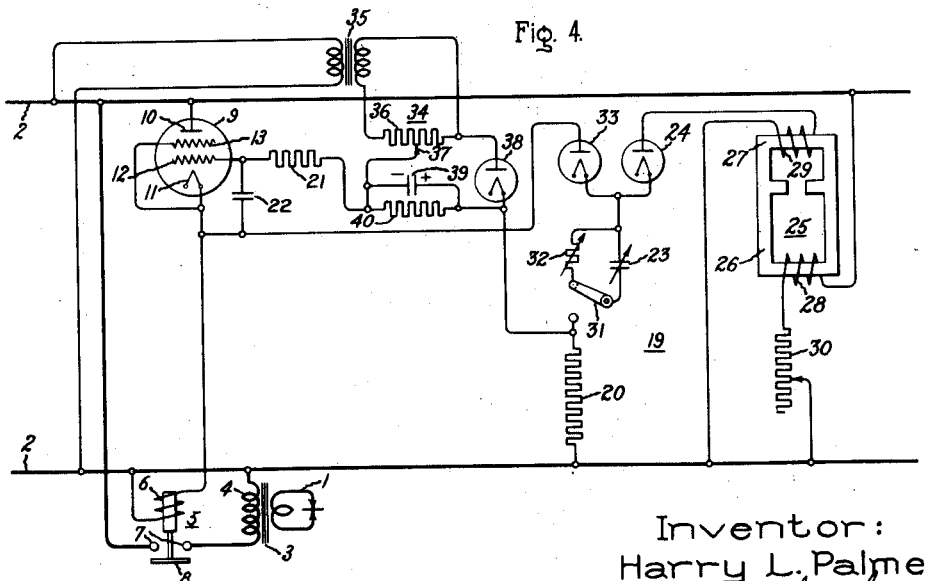

For a better understanding of my invention, reference may be had to the following description taken in connection with the accompanying drawing and its scope will be pointed out in the appended claims. Figs. 1 and 4 diagrammatically illustrate embodiments of my invention as applied to a control circuit for controlling the energization of a welding circuit, and Figs. 2 and 3 represent certain operating characteristics thereof.

Referring now to Fig. 1 of the accompanying drawing, my invention is diagrammatically shown as applied to a control system for effecting energization of a load circuit, such as a welding circuit 1, from an alternating current supply circuit 2 through a transformer 3 having a primary winding 4. A suitable circuit controlling means or translating device is interposed between the load circuit 1 and the supply circuit 2 to control the energization of the load circuit. This translating device may be a relay or electromagnetic contactor 5, having an actuating coil 6, stationary contacts 7 and a bridging member 8, for connecting the primary winding 4 of transformer 3 to the alternating current circuit 2.

In order to control the energization of the translating device, that is to control the energization of the actuating coil 6 of contactor 5 to effect control of the energization of the load circuit 1, I connect in circuit with the actuating coil 6 an electric valve means 9 which may be of the high vacuum type or which may be of the type employing an ionizable medium such as a gas or a vapor. The electric valve means 9 includes an anode 10, a cathode 11 and a pair of control members 12 and 13 which conjointly control the conductivity of the discharge path thereof. While for the purpose of explaining my invention I have chosen to show the electric valve means 9 as comprising a unidirectional conducting device, it is to be understood that I may, if desired, employ a pair of oppositely disposed unidirectional conducting devices to energize the actuating coil 6 of contactor 5 during both positive and negative half cycles of voltage of the alternating current circuit 2.

To impress on control member 13 of electric valve 9 a bias voltage tending to maintain the electric valve nonconductive, I employ a circuit 14 including a transformer 15, a voltage divider including a resistance 16 and an adjustable tap 17, and a current limiting resistance 18. The circuit 14 may be energized from any suitable source of alternating current correlated in phase and frequency relative to the voltage of the alternating current circuit 2. In the particular arrangement of Fig. 1 I have shown the transformer 15 as being connected to the alternating current circuit 2. The magnitude of the bias voltage impressed on control member 13 may be controlled by adjustment of the tap 17. It is to be understood that I may employ a negative unidirectional bias voltage which is impressed on control member 13 and which would tend to maintain electric valve 9 nonconductive.

A circuit 19 is employed to impress on control member 12 a series or train of positive impulses of voltage each sufficient to overcome the effect of the bias voltage impressed on control member 13 to render electric valve 9 conductive for a predetermined maximum number of consecutive half cycles of voltage of like polarity of the alternating current circuit 2. The circuit 19 includes an impedance element such as a resistance 20 which is connected in circuit with control member 12 of electric valve 9 through a current limiting resistance 21. A capacitance 22 may be connected across cathode 11 and control member 12 to suppress or absorb extraneous transient voltages which may exist in the control circuit 19. In order to energize the resistance 20 so that there appears across the terminals thereof a train of positive voltage impulses each sufficient to render the electric valve 9 conductive, I employ in series relation with the resistance 20 an energy storage device, such as the capacitance 23, a unidirectional conducting device 24 and a source of periodic voltage or current. I have chosen to show the source of periodic voltage as comprising a saturable inductive device 25 having a core member 26, a saturable section 27, a primary exciting winding 28 and a secondary control winding 29 in which there is induced an alternating voltage of peaked wave form. By virtue of the serially-connected unidirectional conducting device 24, the voltage impressed across the terminals of the resistance 20 will, of course, be unidirectional. The primary exciting winding 28 of saturable inductive device 25 may be energized from any suitable source of alternating current correlated in phase and frequency relative to the voltage of the alternating current circuit 2 and is shown as being connected to the circuit 2 through adjustable resistance 30. By controlling the magnitude of the resistance 30, it is possible to effect control of the phase of the alternating voltage of peaked wave form induced in secondary winding 29 relative to the voltage of the supply circuit 2. The capacitance 23 may be adjustable and serves to control the maximum consecutive number of voltage impulses appearing across the terminals of resistance 20 which are effective to render electric valve 9 conductive. A suitable circuit controlling means, such as a switch 31, may be connected in series relation with the elements of the circuit 19 to serve as a means for initiating the operation of the system and as a means for resetting the system. There is also provided a discharge circuit for the capacitance 23 including an adjustable resistance 32. When the switch 31 is moved to the upper position, capacitance 23 is short circuited through the resistance 32 and thereby discharges the capacitance 23. As a means for effecting transfer of energy from the anode-cathode circuit of electric valve 9 in accordance with an electrical condition of the electric valve 9, such as the current conducted thereby, I provide means including a unidirectional conducting device 33 which is connected between cathode 11 and the upper plate of capacitance 23 to supply additional or cumulative charges to the capacitance 23 during the intervals when the electric valve 9 is conductive. It will be noted that unidirectional conducting devices 24 and 33 are arranged to establish cumulative charges on the upper plate of capacitance 23. In this manner I provide a feed-back arrangement for transferring energy from the anode-cathode circuit of electric valve 9 to the control circuit 19.

The operation of the embodiment of my invention shown in Fig. 1 will be considered when the system operates to effect energization of the load circuit 1 from the supply circuit 2 during a predetermined interval of time. The adjustable tap 17 of circuit 14 is adjusted so that a proper bias voltage, preferably 180° out of phase relative to the voltage impressed on anode 10, is impressed on the control member 13 tending to maintain the electric valve 9 nonconductive. When the switch 31 is moved to the lower position there will appear across the terminals of resistance 20 a train of positive voltage impulses which are impressed on control member 12 through resistance 21 and each of which is sufficient to overcome the effect of the bias voltage impressed on control member 13 rendering the electric valve 9 conductive. The maximum consecutive number of impulses of positive voltage which are effective to render the electric valve 9 conductive may be controlled by adjusting the capacitance 23. Since the current impulses supplied to resistance 20 are of peaked wave form, the instant at which the electric valve 9 is rendered conductive during the positive half cycles of voltage impressed thereacross may be accurately controlled. By virtue of the unidirectional conducting device 33, during the positive half cycles of conduction of electric valve 9 there will be established additional charges on capacitance 23, thereby increasing the stored energy thereof. It is to be noted that the magnitude of this additional charge is a function of the voltage impressed on actuating coil 6 of the contactor 5. The circuit may be reset by moving the switch 31 to the upper position thereby closing the discharge circuit and permitting capacitance 23 to discharge through resistance 32.

The operation of my invention may be better understood by referring to the operating characteristics shown in Figs. 2 and 3. Curve A of Fig. 2 represents the voltage appearing across actuating coil 6 of contactor 5. The positive portion of this curve represents the voltage impressed thereacross by the alternating current circuit 2 through electric valve 9 and the negative portion thereof represents the voltage appearing across the inductive coil 6 due to the stored energy thereof. Curves, B, C and D of Fig. 3 represent the rectified voltages of peaked wave form provided by the saturable inductive device 25 and the unidirectional conducting device 24 and are spaced apart by substantially 360 electrical degrees. Let it be assumed that the capacitance 23 is adjusted so that the electric valve 9 is rendered conductive for three consecutive positive half cycles of voltage of the alternating current circuit 2. The distance $a$ represents the amount of energy stored in capacitance 23 by virtue of the impulse of current or voltage represented by Curve B, and the distance $b$ represents the increment of energy stored in capacitance 23 and which is transferred from the anode-cathode circuit of electric valve 9 through unidirectional conducting device 33 and resistance 20. It will be noted that the net voltage $c$ impressed on control member 12 of electric valve 9 when the second impulse of peaked voltage C is applied is substantially less than the immediately preceding impulse and that the magnitudes of the voltages impressed on the control member 12 progressively decrease in value. After the electric valve 9 has been rendered conductive by a third impulse of current of peaked wave form, the capacitance 23 is sufficiently charged so that subsequent impulses of voltage of peaked wave form are ineffective to establish across the terminals of resistance 20 voltages sufficient to render the electric valve 9 conductive.

One of the principal advantages of my invention is the accurate timing of the period of energization of an associated load circuit without sacrificing the highly desirable precision in the control of the time or instant at which the electric valve 9 is rendered conductive. This desirable feature is afforded principally by transferring energy from the anode-cathode circuit of electric valve 9 to the control circuit 15 during the intervals or half cycles of conduction of the electric valve 9.

The arrangement of my invention diagrammatically shown in Fig. 4 is similar in many respects to that shown in Fig. 1 and corresponding elements have been assigned like reference numerals. In the arrangement of Fig. 4, the control member 13 is shown as being connected to the cathode 11, and the control of the electric valve 9 is effected by impressing on the control member 12 a negative unidirectional bias voltage and a positive control voltage. Any suitable arrangement known in the art may be employed to introduce in the circuit 19 a negative unidirectional bias voltage tending to maintain the electric valve 9 nonconductive. I employ a circuit 34 including a transformer 35, a voltage divider comprising a resistance 36 having an adjustable tap 37, a unidirectional conducting device 38, a capacitance 39 and a resistance 40 connected in shunt relation with the capacitance 39. The capacitance 39 is connected to be charged from the voltage divider through the unidirectional conducting device 38 to establish a negative charge on the left-hand plate thereof and to impress on control member 12 a negative unidirectional bias voltage.

The operation of the embodiment of my invention shown in Fig. 4 is substantially the same as that of Fig. 1. The tap 37 of circuit 34 is adjusted to control the magnitude of the negative unidirectional bias voltage which tends to maintain the valve 9 nonconductive and the capacitance 23 is adjusted to control the maximum consecutive number of positive voltage impulses which are effective to render the electric valve 9 conductive. When the switch 31 is moved to the lower circuit position there will be impressed on control member 12 a train of impulses of positive voltage sufficient to render the electric valve 9 conductive during a predetermined number of consecutive positive half cycles of voltage of the alternating current circuit 2 to effect energization of the load circuit 1 for a corresponding interval of time. The time at which the electric valve 9 is rendered conductive during the positive half cycles of voltage of circuit 2 is controlled by virtue of the voltage of peaked wave form appearing across the terminals of resistance 20, and the period of energization of the load circuit 1 is also accurately determinable by virtue of the energy transfer from the anode-cathode circuit of electric valve 9 to capacitance 23.

While I have shown and described my invention as applied to a particular system of connections and as embodying various devices diagrammatically shown, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States is:

1. In combination, an alternating current circuit, a translating device, an electric valve means for energizing said translating device from said alternating current circuit, said electric valve means including a discharge path and a control means for controlling the conductivity thereof, a control circuit for energizing said control means including means for impressing thereon a bias voltage tending to maintain said discharge path nonconductive, an impedance element, a serially-connected energy storage device and a source of periodic current connected across said impedance element for supplying a predetermined number of voltage impulses across said impedance element to overcome said bias voltage to render said discharge path conductive for a predetermined number of consecutive half cycles of voltage of the same polarity impressed thereacross by said alternating current circuit, and means responsive to an electrical condition of said translating device for increasing the stored energy of said energy storage device.

2. In combination, an alternating current circuit, a translating device, an electric valve means for energizing said translating device from said alternating current circuit, said electric valve means including a discharge path and a control means for controlling the conductivity thereof, a control circuit for energizing said control means including means for impressing thereon a bias voltage tending to maintain said discharge path nonconductive, an impedance element, a serially-connected energy storage device and a source of periodic current connected across said impedance element for supplying a predetermined number of voltage impulses across said impedance element to overcome said bias voltage to render said discharge path conductive for a predetermined number of consecutive half cycles of voltage of the same polarity impressed thereacross by said alternating current circuit, and means responsive to the current transmitted by said electric valve during said half cycles for increasing the stored energy of said storage device to decrease progressively the magnitudes of said voltage impulses.

3. In combination, an alternating current circuit, a translating device, an electric valve means for energizing said translating device from said alternating current circuit, said electric valve means including a discharge path and control means for controlling the conductivity thereof, and a control circuit for energizing said control means including means for impressing thereon a bias voltage tending to maintain said electric valve means nonconductive, an impedance element connected in circuit with said control means, a serially-connected capacitance and a source of periodic voltage connected across said impedance element for supplying a predetermined number of voltage impulses across said impedance element to overcome said bias voltage to render said discharge path conductive for a predetermined number of consecutive half cycles of voltage of the same polarity impressed thereacross by said alternating current circuit and means for increasing the charge on said capacitance in accordance with the current conducted by said electric valve means.

4. In combination, an alternating current circuit, a load circuit, a translating device interposed between said alternating current circuit and said load circuit for effecting energization thereof, an electric valve for energizing said translating device from said alternating current circuit, said electric valve including a discharge path and a control means for controlling the conductivity thereof, a control circuit for energizing said control member including means for impressing thereon a bias voltage tending to maintain said discharge path nonconductive, an impedance element and a serially-connected energy storage device and a source of periodic voltage connected across said impedance element for supplying a predetermined number of voltage impulses across said impedance element to overcome said bias voltage to maintain said discharge path conductive for a predetermined number of consecutive half cycles of voltage of the same polarity impressed thereacross by said alternating current circuit and to effect energization of said load circuit for a corresponding interval of time, and means for energizing said energy storage device in accordance with the current conducted by said electric valve.

5. In combination, an alternating current circuit, a translating device, an electric valve for energizing said translating device from said alternating current circuit, said electric valve including a discharge path and control member for controlling the conductivity thereof, a control circuit for energizing said control member including means for impressing thereon a bias voltage tending to maintain said discharge path nonconductive, an impedance element, a serially-connected capacitance, a unidirectional conducting device and a source of periodic voltage connected across said impedance element for supplying a predetermined number of positive voltage impulses across said impedance element sufficient in magnitude to overcome said bias voltage to render said discharge path conductive for a corresponding number of consecutive half cycles of voltage of like polarity impressed thereacross by said alternating current circuit, the magnitudes of said positive voltage impulses progressively decreasing in value, and means for effecting transfer of energy from the anode-cathode circuit of said electric valve to said control circuit.

6. In combination, an alternating current circuit, a translating device, an electric valve for energizing said translating device from said alternating current circuit, said electric valve including a discharge path and a control member for controlling the conductivity thereof, a control circuit for energizing said control member including means for impressing thereon a unidirectional bias voltage tending to maintain said discharge path nonconductive, an impedance element connected in circuit with said means and said control member and a serially-connected capacitance, a unidirectional conducting device and a source of periodic current connected across said impedance element for supplying a predetermined number of positive voltage impulses across said impedance element to overcome said bias voltage to render said discharge path conductive for a corresponding number of consecutive half cycles of voltage of like polarity impressed thereacross by said alternating current circuit, and means for charging said capacitance in accordance with the voltage impressed across said translating device.

7. In combination, an alternating current circuit, a translating device, an electric valve for energizing said translating device from said alternating current circuit, said electric valve including a discharge path and a pair of control members for conjointly controlling the conductivity thereof, a control circuit including means for impressing on one of said control members a bias voltage tending to maintain said discharge path nonconductive, an impedance element connected in circuit with the other of said control members, a serially-connected energy storage device and a source of periodic voltage connected across said impedance element for supplying a predetermined number of voltage impulses across said impedance element sufficient in magnitude to overcome the effect of said bias voltage to render said discharge path conductive for a predetermined number of consecutive half cycles of voltage of the same polarity impressed thereacross by said alternating current circuit, and means for increasing the stored energy of said energy storage device in accordance with an electrical condition of said translating device.

8. In combination, an alternating current circuit, a translating device, an electric valve for energizing said translating device from said alternating current circuit, said electric valve including a discharge path and a control member for controlling the conductivity thereof, a control circuit for energizing said control member including means for impressing thereon a negative unidirectional bias voltage tending to maintain said discharge path nonconductive, an impedance element and a serially-connected capacitance, a unidirectional conducting device and a source of alternating voltage of peaked wave form connected across said impedance element for supplying a predetermined number of positive voltage impulses across said impedance element to overcome said negative bias voltage to render said discharge path conductive for a predetermined number of consecutive half cycles of voltage of the same polarity impressed thereacross by said alternating current circuit, and means comprising a second unidirectional conducting device for increasing the charge of said capacitance in accordance with the voltage impressed across said translating device.

HARRY L. PALMER.